US010676381B2

(12) United States Patent
Kotze

(10) Patent No.: US 10,676,381 B2

(45) **Date of Patent: *Jun. 9, 2020**

(54) EFFLUENT TREATMENT PROCESS FOR SULPHATE REMOVAL

(71) Applicant: MINTEK, Randburg (ZA)

(72) Inventor: Martha Hendriette Kotze, Randburg (ZA)

(73) Assignee: MINTEK, Randburg (ZA)

( * ) Notice: Subject to any disclaimer, the term of this patent is extended or adjusted under 35 U.S.C. 154(b) by 229 days.

This patent is subject to a terminal disclaimer.

(21) Appl. No.: 15/746,587

(22) PCT Filed: Jul. 22, 2016

(86) PCT No.: PCT/ZA2016/050025

§ 371 (c)(1),
(2) Date: Jan. 22, 2018

(87) PCT Pub. No.: WO2017/015678

PCT Pub. Date: Jan. 26, 2017

(65) Prior Publication Data

US 2019/0002312 A1 Jan. 3, 2019

(30) Foreign Application Priority Data

Jul. 22, 2015 (ZA) ................................ 2015/05275

(51) Int. Cl.

*C02F 1/52* (2006.01)
*C02F 1/66* (2006.01)

(Continued)

(52) U.S. Cl.

CPC .............. *C02F 1/5245* (2013.01); *C02F 1/66* (2013.01); *C02F 2001/5218* (2013.01); *C02F 2101/101* (2013.01); *C02F 2101/20* (2013.01); *C02F 2101/203* (2013.01); *C02F 2101/206* (2013.01); *C02F 2103/10* (2013.01); *C02F 2209/06* (2013.01); *C02F 2303/18* (2013.01)

(58) Field of Classification Search

None

See application file for complete search history.

(56) References Cited

U.S. PATENT DOCUMENTS

2003/0160003 A1 8/2003 Maree
2012/0160770 A1 6/2012 Banerjee et al.

(Continued)

FOREIGN PATENT DOCUMENTS

EP 0 986 518 3/2000
WO WO 2014/033361 3/2014
WO WO-2015162540 A1 * 10/2015

OTHER PUBLICATIONS

International Search Report; PCT/ZA2016/050025, dated May 12, 2017.

(Continued)

*Primary Examiner* — Bradley R Spies

(74) *Attorney, Agent, or Firm* — Young & Thompson

(57) ABSTRACT

Disclosed is an acid waste water treatment and method wherein heavy metal hydroxides and gypsum are precipitated in a single operation and wherein amorphous aluminium trihydroxide and gypsum are separated in a single solid-solid separation unit.

20 Claims, 4 Drawing Sheets

(51) Int. Cl.

| | |
|---|---|
| ***C02F 101/10*** | (2006.01) |
| ***C02F 101/20*** | (2006.01) |
| ***C02F 103/10*** | (2006.01) |

(56) References Cited

U.S. PATENT DOCUMENTS

| | | | | |
|---|---|---|---|---|
| 2014/0144843 | A1 | 5/2014 | Banerjee et al. | |
| 2017/0036936 | A1 * | 2/2017 | Paxton | C02F 9/00 |

OTHER PUBLICATIONS

Written Opinion dated May 12, 2017, Application No. PCT/ZA2016/050025.

* cited by examiner (FIRST STAGE)

FIGURE 2 (SECOND STAGE)

(THIRD STAGE)

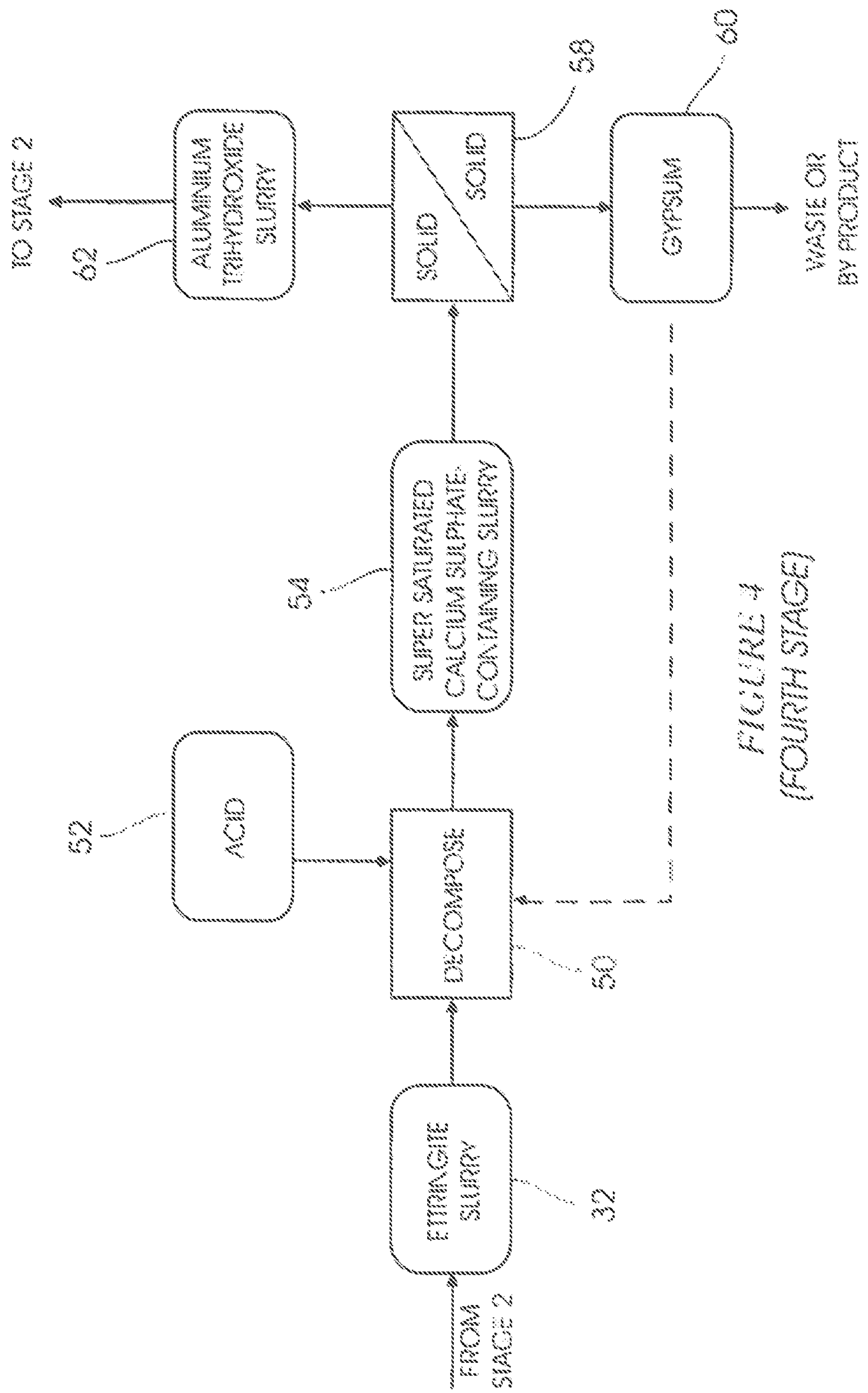
FIGURE 4 (FOURTH STAGE)

EFFLUENT TREATMENT PROCESS FOR SULPHATE REMOVAL

BACKGROUND OF THE INVENTION

This invention relates to a process for the removal of heavy metals, calcium and sulphate from contaminated water, typically mine waters.

Effluent streams, and in particular acid mine drainage water, are generally acidic with pH values as low as 1.5. Another characteristic is the high levels of heavy metals, calcium and sulphate associated with the water. Prior to discharge into the environment these waste streams are normally neutralised with lime, a process which leaves large quantities of calcium sulphate in solution. The release of such waters into the environment poses a significant environmental challenge.

International patent application number PCT/GB98/01610 describes a process, generally referred to as "the SAVMIN process", which was developed particularly for the treatment of sulphate-containing mine waters as well as sulphate-containing waste/effluent waters. This process allows for the effective removal of sulphate and calcium from effluent water with the use of amorphous aluminium trihydroxide followed by a subsequent recovery of the latter reagent by decomposing a waste product.

The SAVMIN process is fully described in the specification of the aforementioned patent application and the content of that specification is hereby incorporated fully into this specification.

In one stage of the SAVMIN process, a saturated calcium sulphate water stream (produced by preliminary steps) is combined with amorphous aluminium trihydroxide and a neutralising agent, for example hydrated lime, for the removal of sulphate and calcium from solution, to promote the precipitation of ettringite which is removed from the water stream, e.g. by settling, to produce a slurry.

This is followed by the recovery of amorphous aluminium trihydroxide by decomposing the ettringite slurry at a pH ranging from 4 to 8.5. The pH is lowered by adding sulphuric acid ($H_2SO_4$), resulting in the formation of a supersaturated calcium sulphate solution.

The solids resulting from the decomposition step are gypsum and amorphous aluminium trihydroxide. These solids are separated from one another by means of a suitable solid-solid separation unit, for example, a hydro-cyclone(s).

The recovered amorphous aluminium trihydroxide is recycled to treat a water stream containing sulphate and calcium. This recovery step ensures that the SAVMIN process is highly cost effective when compared to alternative processes such as ion exchange and membrane separation techniques.

The SAVMIN process, however, is characterised by a relatively large number of solid/liquid separation steps.

An object of the present invention is to reduce the number of unit operations which are used in the SAVMIN process (as described in the SAVMIN specification). This, in turn, results in process simplification and ease of operation, and lowers capital and operating costs.

SUMMARY OF THE INVENTION

In a (preliminary) step 1 of the SAVMIN process (PCT/GB98/01610) the pH of the acid waste water is raised so that heavy metals precipitate out of solution in the form of hydroxides. The precipitates are separated from the waste water by using a solid-liquid separator 10 to generate a first supersaturated calcium sulphate-containing solution. Thereafter, in a step 2, the supersaturated solution is de-supersaturated by using gypsum seed to remove the calcium sulphate as gypsum in a high solid precipitator 12, thereby forming a first saturated calcium sulphate-containing solution which is then treated with amorphous aluminium trihydroxide.

According to one aspect of the present invention the heavy metal hydroxides and the gypsum are precipitated in a single unit operation, thereby eliminating a reactor unit and a solid-liquid separation unit.

FIG. 2 in the SAVMIN patent specification illustrates the recovery of amorphous aluminium trihyroxide from ettringite wherein the ettringite slurry is decomposed by lowering its pH by the addition of sulphuric acid. A second supersaturated solution of calcium sulphate is formed with amorphous aluminium trihydroxide in suspension. The amorphous aluminium trihydroxide is then separated from the second supersaturated solution in a liquid-solid separator 18. Following the removal of the amorphous aluminium trihydroxide, the supersaturated calcium sulphate solution is de-supersaturated by removing calcium sulphate as gypsum using a liquid-solid separator for 22.

In the present invention, the formation of the amorphous aluminium trihydroxide and the gypsum is carried out in one reactor and a single solid-solid separation unit is used to separate the amorphous aluminium trihydroxide and the gypsum.

In accordance with this aspect of the invention there is provided a method for the removal of sulphates and calcium from an acidic water stream which includes the steps of:

(1) raising the pH of the water stream to precipitate impurities from the stream and to form a first supersaturated calcium sulphate-containing stream;
(2) removing the impurities and de-supersaturating the first supersaturated calcium sulphate-containing stream in a first liquid-solid separation step to form a first saturated calcium sulphate-containing solution;
(3) adding amorphous aluminium trihydroxide to the first saturated calcium sulphate-containing solution to form a product water stream containing precipitated ettringite;
(4) removing the precipitated ettringite, in a slurry, from the product water stream in a second liquid-solid separation step;
(5) lowering the pH of the ettringite slurry to recover amorphous aluminium trihydroxide in a second supersaturated calcium sulphate-containing stream, and
(6) removing the amorphous aluminium trihydroxide in a solid/solid separation step to form a third supersaturated calcium sulphate-containing solution.

In step (1) of this method, the pH may be increased by adding calcium hydroxide, calcium oxide or hydrated lime to the acidic water stream. The pH is preferably raised to a value of between 10.0 and 12.0.

The impurities may include iron, aluminium, manganese, magnesium and other heavy metals. These impurities are precipitated out of solution as hydroxides.

Following step (4), the pH of the product water stream may be lowered by adding $CO_2$ to precipitate calcium carbonate. The calcium carbonate may be separated from the product water, in a third liquid-solid separation step, to form a purified water.

In step (2) the first supersaturated calcium sulphate-containing streams may each be de-supersaturated by removing calcium sulphate in the form of gypsum.

In step (5) of this method, the pH of the ettringite may be lowered the addition of an acid such as sulphuric acid, or hydrochloric acid, or $CO_2$ or $SO_2$. The pH is lowered to a value between 4 and 8.5. Preferably, the pH is lowered to a value between 8 and 8.5.

The second and third supersaturated calcium sulphate-containing streams may include calcium sulphate in the form of gypsum. The gypsum may be in a crystallised form.

In step (6), the solid/solid separation may be achieved by means of size exclusion, wherein particles of the crystallised gypsum are larger than particles of the amorphous aluminium.

BRIEF DESCRIPTION OF THE DRAWINGS

The invention is further described by way of example with reference to the accompanying drawings which, in combination, constitute a flow sheet for the SAVMIN process which incorporates modifications according to the present invention, and wherein, specifically:

FIG. 4 shows a fourth stage which embodies an ettringite decomposition stage.

DESCRIPTION OF PREFERRED EMBODIMENT

FIGS. 1 to 4 illustrate aspects of four stages of an effluent treatment process based on the SAVMIN process which is modified in accordance with the teachings of the present invention. These stages involve the removal of metals and sulphate at ambient conditions from contaminated mine waters.

Figure 1:
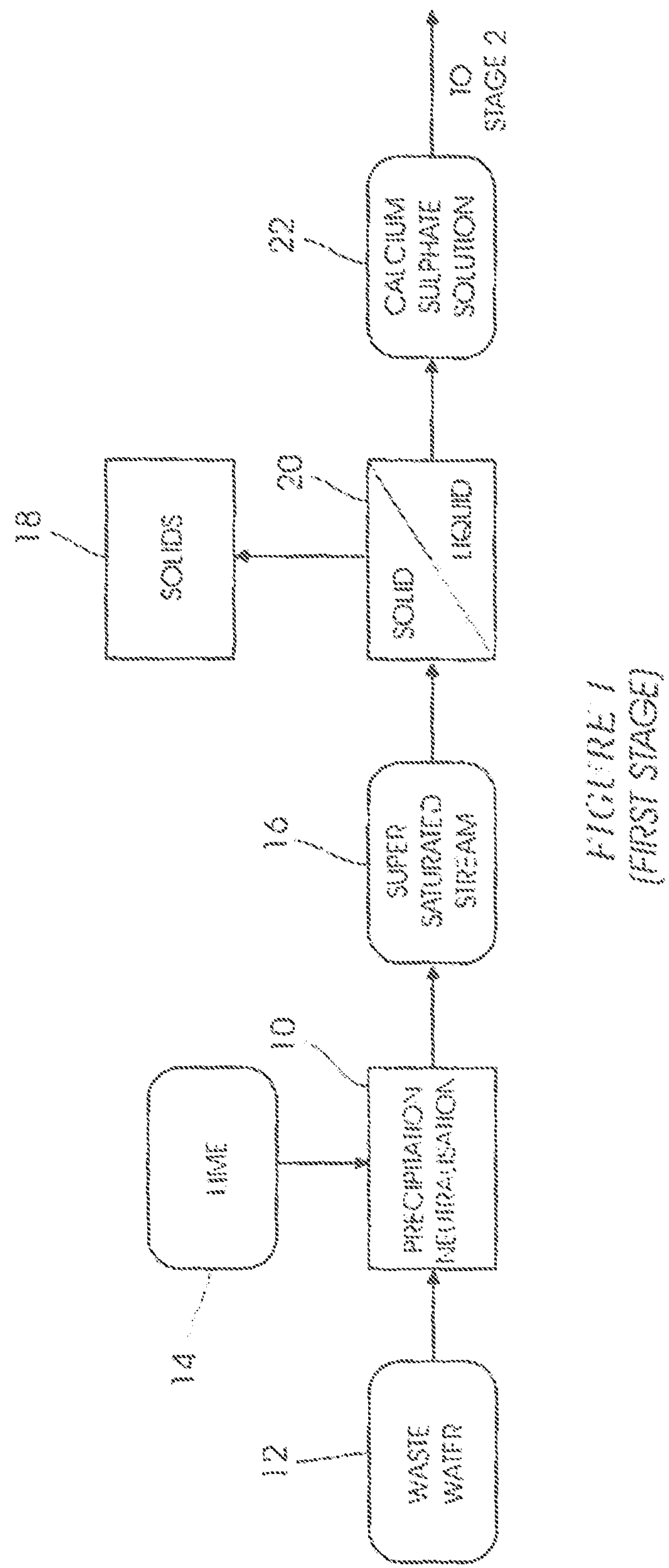
FIG. 1 shows a first stage which embodies a heavy metal and gypsum precipitation stage.

FIG. 1 illustrates a modified first stage of the SAVMIN process. In a step 10 waste water 12, typically acidic mine water, is contacted with an alkali 14 such as hydrated lime ($Ca(OH)_2$) to form a first supersaturated calcium sulphate-containing stream 16 at a pH between 10.0 and 12.0. The supersaturated calcium sulphate-containing stream 16 contains solids 18 in the form of crystallised gypsum and precipitated impurities such as heavy metal hydroxides. The solids 18 are removed from the stream 16 in a liquid-solid separation step 20 to form a first saturated calcium sulphate solution 22.

In the SAVMIN process the precipitated impurities and the gypsum are removed in separate liquid-solid separation steps (see FIG. 1—blocks 1 and 2 of the SAVMIN patent specification).

Figure 2:
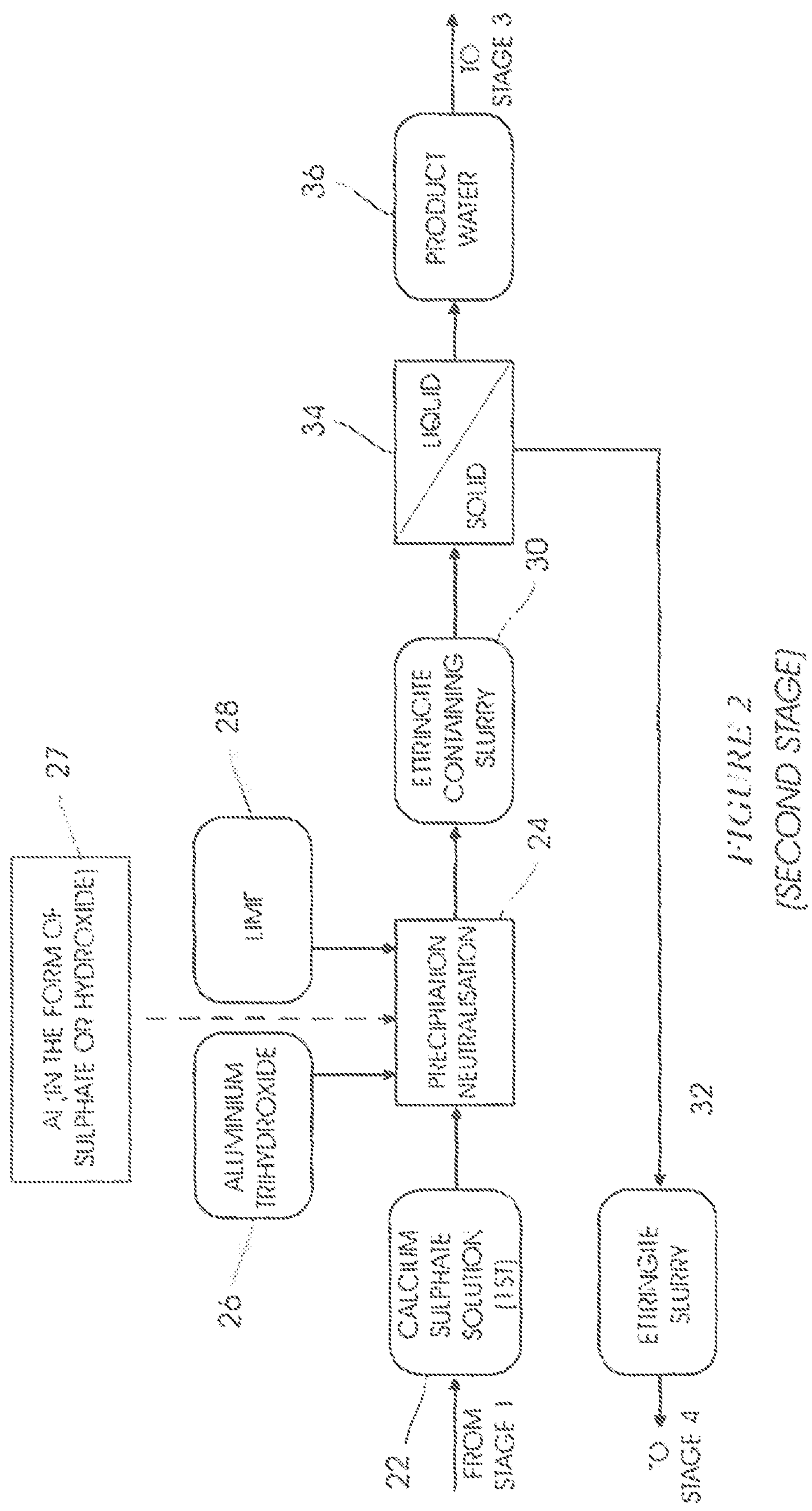
FIG. 2 shows a second stage which embodies an ettringite precipitation stage.
Figure 3:
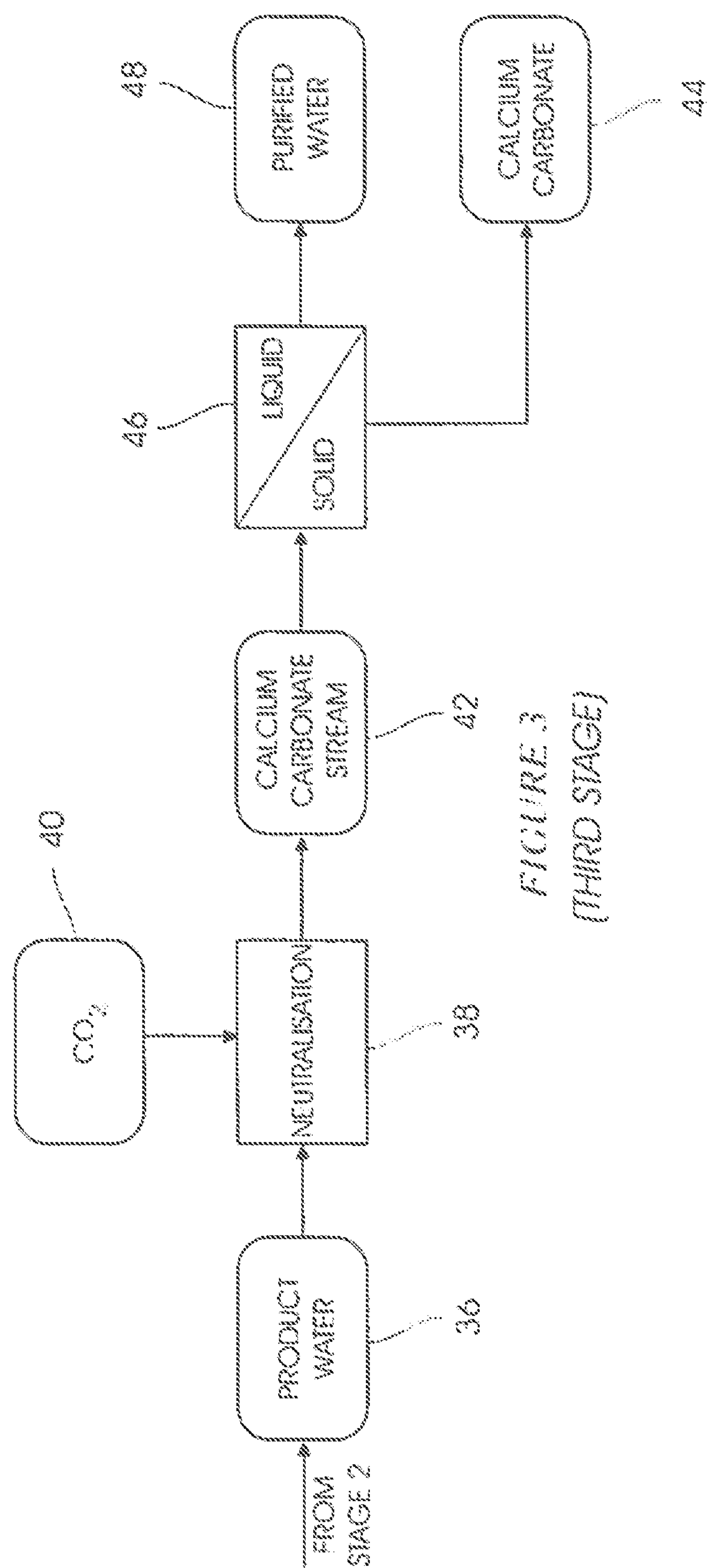
FIG. 3 shows a third stage which embodies a carbonation stage.

In a step 24 in a second stage of the present invention, shown in FIG. 2, amorphous aluminium trihydroxide 26, hydrated lime 28 and a "top-up" aluminium-containing stream 27 (in the form of aluminium trihydroxide or aluminium sulfate) are added to the saturated calcium sulphate solution 22 to form an ettringite-containing slurry 30.

Ettringite 32, in the form of a slurry, is removed from the ettringite-containing slurry 30 in a liquid-solid separation step 34, thereby forming a high pH product water 36 containing low amounts of sulphate.

In a neutralisation step 38 of a third stage (FIG. 3) gaseous carbon dioxide 40 is added to the product water 36 to form a calcium carbonate-containing stream 42. Calcium carbonate 44 is removed from the stream 42 in a liquid-solid separation step 46 to form a purified product water 48.

In a decomposition step 50 of a fourth stage (FIG. 4) acid 52, such as, but not limited to, sulphuric acid or hydrochloric acid, is added to the ettringite 32, causing it to decompose and form a second supersaturated calcium sulphate-containing slurry 54 (i.e. containing crystalized gypsum) in which amorphous aluminium trihydroxide is suspended.

The ettringite 32 decomposes in the step 50 at a pH of between 4 and 8.5. For optimum results, however, the pH of the decomposition step 50 should be between 8 and 8.5.

Gypsum and aluminium trihydroxide are separated from one another in a solid/solid separation step 58 to form a gypsum-containing slurry 60 and aluminium trihydroxide-containing slurry 62. Slurries 60 and 62 each contain a portion of the supersaturated sulphate-containing slurry 54. The solid/solid separation step 58 is mainly achieved by means of size exclusion.

A portion of the gypsum slurry 60 is sent to the ettringite decomposition step 50 for seeding. The remaining portion of the gypsum slurry 60 is removed from the system as by-product or waste.

The aluminium trihydroxide slurry 62 is recycled to stage 2 for use in the step 24.

In the SAVMIN process (see FIG. 2 of the SAVMIN patent specification) after decomposition of the ettringite (step 5) amorphous aluminium trihydroxide is recovered using a separator 18. Thereafter gypsum, which is precipitated in a reactor 20, is separated using a separator 22.

The modified process as herein described therefore eliminates two reactors from the original process. This leads to a reduction in plant size and reagent costs, significantly lowering primarily the CAPEX and slightly reducing the OPEX of the process.

Successful solid-solid separation of the amorphous aluminium trihydroxide slurry from the gypsum-containing slurry is possible due to the difference in particle size of the gypsum and the amorphous aluminium trihydroxide. The separation is enhanced by increasing the difference between the particle size of the gypsum and the amorphous aluminium trihydroxide. This is achieved by growing the gypsum particles/crystals by means of seed recycling to form larger particles/crystals. Amorphous aluminium trihydroxide does not readily crystallise nor grow in particle size.

A further benefit arises by working in the aforementioned pH range of 8 to 8.5 (as is described hereinafter in the examples), a 99.5% recovery of amorphous aluminium trihydroxide precipitate 62 is achieved. This is to be contrasted with the recovery rate of "greater than 95%" of amorphous aluminium trihydroxide described in the SAVMIN specification. Additionally, the co-precipitation of basic aluminium sulphate, in the ettringite decomposition step 50, is minimised. This is important because it prevents the reintroduction of sulphate in the ettringite precipitation step when recycling the amorphous aluminium trihydroxide that is also precipitated. The introduction of additional sulphate, in the form of basic aluminium sulphate, increases the lime and amorphous aluminium trihydroxide requirements in the ettringite precipitation step. Ultimately this would lead to an increase in the acid requirement in the ettringite decomposition step.

Aspects of the invention are further described in the following examples:

Example 1

This example illustrates the effect of pH on the formation of aluminium precipitates.

The precipitation of various aluminium phases, namely aluminium trihydroxide ($Al(OH)_3$), from sulphate media at pH values of 6.5, 7.0, 7.5, 8.0 and 8.5 was investigated. The effect of variations in pH on the types of solid phases formed was examined. The sulphate medium used consisted of aluminium sulphate solutions ($Al_2(SO_4)_3$) prepared at 10 g/L. The pH of the medium was controlled with the addition of a caustic soda (NaOH) solution at a concentration of 500 g/L. Results from the precipitation tests revealed that the precipitated phases contained, in addition to aluminium, high amounts of sulphates. This indicated the formation of two phases, namely aluminium trihydroxide ($Al(OH)_3$) and basic aluminium sulphate with the general formula ($Al(OH)_x(SO_4)_y$). It was also found that the optimum pH for the formation of $Al(OH)_3$ is in the range of 8.0 to 8.5. At this pH the amount of aluminium sulphate formed was reduced.

TABLE 1

| Assay of solids formed | | | | | |
|---|---|---|---|---|---|
| | pH 6.5 | pH 7.0 | pH 7.5 | pH 8.0 | pH 8.5 |
| Al, % | 26 | 26 | 28 | 32 | 34 |
| $SO_4^{2-}$, % | 18 | 16 | 14 | 12 | 10 |

Example 2

A fully integrated pilot plant operated as per the diagram of the type shown in FIGS. 1 to 4, capable of processing 10 L/h of water, was operated for a period of 2 weeks. The combination of the heavy metal precipitation stage and the gypsum de-supersaturation stage was successful and average precipitation efficiencies of 98%, 97%, 96%, 96% and 25% were achieved for magnesium, manganese, aluminium, iron and sulphate respectively. The results in the ettringite precipitation stage showed that the target sulphate concentration of 400 mg/L (SANS Class I specification) in the overflow was reached, and potable water was produced after the carbonation stage in FIG. 3. The results from the ettringite decomposition stage showed a 99.5% recovery of amorphous aluminium trihydroxide precipitate.

Example 3

This example illustrates heavy metal and gypsum precipitation, ettringite precipitation and ettringite decomposition steps of the invention.

A mini pilot plant capable of processing 100 L/h of acid mine water using the consolidated process of FIGS. 1 to 4 was operated continuously for a period of four weeks. The feed to the plant consisted of a synthetic solution containing bivalent cations such as $Mg^{2+}$, $Ca^{2+}$, $Mn^{2+}$, as well as $SO_4^{2-}$ and $Fe^{2+}$. The average feed composition is presented in Table 2.

TABLE 2

| Feed water composition (expressed in mg/L) | | | | | | |
|---|---|---|---|---|---|---|
| Mg | Al | Si | Ca | Ti | Cr | Mn |
| 67 | 42 | 6 | 295 | 2 | 2 | 39 |
| Co | Ni | Cu | Zn | Pb | Fe | $SO_4^{2-}$ |
| <2 | <2 | <2 | <2 | <2 | 4 | 1308 |

The results of the pilot campaign showed that the process was effective at removing heavy metals from contaminated water. The treated water produced was nearly free of heavy metal ions, namely iron, aluminium, manganese and magnesium. Removal efficiencies of 97% and 93% were obtained for magnesium and manganese, respectively. Lime consumption was averaged at 1.4 kg/$m^3$ of feed water.

The removal of sulphate and calcium ions from contaminated water via ettringite precipitation produced SANS Class I water in terms of sulphate (<400 mg/L) with sulphate removal efficiencies ranging from 80% to 91%, and calcium removal efficiencies as high as 74%. The corresponding aluminium trihydroxide consumption rate was in the range of 0.9 to 1.1 kg/$m^3$ of feed water at an aluminium trihydroxide feed ratio of approximately 1.1 to 1.3 times the stoichiometric amount required. The consumption of lime ranged between 1.0 and 1.8 kg/$m^3$ of feed water. Aluminium trihydroxide was regenerated in the ettringite decomposition step with the addition of sulphuric acid at a rate of around 0.4 kg/$m^3$ of feed water.

The invention claimed is:

1. A method for the removal of sulphates and calcium from an acidic waste water stream which includes the steps of:

(1) raising the pH of the acidic waste water stream to precipitate impurities from the stream and form a first supersaturated calcium sulphate-containing stream;

(2) removing the impurities and de-supersaturating the first supersaturated calcium sulphate-containing stream in a first solid/liquid separation step to form a first saturated calcium sulphate-containing solution;

(3) adding amorphous aluminium trihydroxide to the first saturated calcium sulphate solution to precipitate ettringite in a product water stream;

(4) removing the precipitated ettringite, in the form of an ettringite-containing slurry from the product water stream using a second liquid-solid separation step;

(5) lowering the pH of the ettringite-containing slurry to decompose the ettringite and form amorphous aluminium trihydroxide (recovered) and gypsum contained in a second supersaturated calcium sulphate-containing stream, and (6) separating the recovered amorphous aluminium trihydroxide and gypsum in a solid-solid separation step to form an aluminium trihydroxide containing slurry and a second saturated calcium sulphate-containing solution.

2. A method according to claim 1 wherein, in step (1), calcium hydroxide or calcium oxide is added to the acidic waste water stream.

3. A method according to claim 1 wherein, in step (1), the pH is raised to a value of between 10.0 and 12.0.

4. A method according to claim 1, wherein the impurities include iron, aluminium, manganese, magnesium and other heavy metals.

5. A method according to claim 1 wherein, following step 4, the pH of the product water stream is lowered by adding $CO_2$ to precipitate calcium carbonate.

6. A method according to claim 5 wherein the calcium carbonate is separated from the product water in a third liquid-solid separation step to form a purified water.

7. A method according to claim 1 wherein the first, and the second, supersaturated calcium sulphate-containing streams are de-supersaturated by removing calcium sulphate as gypsum.

8. A method according to claim 1 wherein, in step (5), the pH of the ettringite is lowered by the addition of sulphuric acid, hydrochloric acid, $CO_2$ or $SO_2$.

9. A method according to claim 1 wherein, in step (5), the pH of the ettringite is lowered to a value between 4 and 8.5.

10. A method according to claim 9 wherein, in step (5), the pH of the ettringite is lowered to a value between 8 and 8.5.

11. A method according to claim 1 wherein the second and third supersaturated calcium sulphate-containing streams include calcium sulphate in the form of gypsum.

12. A method according to claim 11 wherein the gypsum is in a crystallised form.

13. A method according to claim 12 wherein, in step (6), the solid-solid separation is achieved by means of size exclusion, wherein particles of the crystallised gypsum are larger than particles of the amorphous aluminium.

14. A method according to claim 2 wherein, in step (1), the pH is raised to a value of between 10.0 and 12.0.

15. A method according to claim 2, wherein the impurities include iron, aluminium, manganese, magnesium and other heavy metals.

16. A method according to claim 3, wherein the impurities include iron, aluminium, manganese, magnesium and other heavy metals.

17. A method according to claim 2 wherein, following step 4, the pH of the product water stream is lowered by adding $CO_2$ to precipitate calcium carbonate.

18. A method according to claim 3 wherein, following step 4, the pH of the product water stream is lowered by adding $CO_2$ to precipitate calcium carbonate.

19. A method according to claim 4 wherein, following step 4, the pH of the product water stream is lowered by adding $CO_2$ to precipitate calcium carbonate.

20. A method according to claim 2 wherein the first, and the second, supersaturated calcium sulphate-containing streams are de-supersaturated by removing calcium sulphate as gypsum.

* * * * *